US012003055B2

(12) United States Patent
Yan et al.

(10) Patent No.: US 12,003,055 B2
(45) Date of Patent: Jun. 4, 2024

(54) SNAP-FIT TYPE SELF-LOCKING COMBINED UPPER COVER FOR A POWER STRIP

(71) Applicant: Jiangsu General Protecht Co., Ltd., Suzhou (CN)

(72) Inventors: Hua Yan, Suzhou (CN); Bin Chen, Suzhou (CN); Sufeng Cai, Suzhou (CN)

(73) Assignee: JIANGSU GENERAL PROTECHT CO., LTD., Suzhou (CN)

( * ) Notice: Subject to any disclaimer, the term of this patent is extended or adjusted under 35 U.S.C. 154(b) by 340 days.

(21) Appl. No.: 17/637,586

(22) PCT Filed: Aug. 27, 2020

(86) PCT No.: PCT/CN2020/000190

§ 371 (c)(1),
(2) Date: Feb. 23, 2022

(87) PCT Pub. No.: WO2021/047123

PCT Pub. Date: Mar. 18, 2021

(65) Prior Publication Data

US 2022/0278477 A1 Sep. 1, 2022

(30) Foreign Application Priority Data

Sep. 11, 2019 (CN) ......................... 201921513715.1

(51) Int. Cl.
*H01R 13/502* (2006.01)
*H01R 13/506* (2006.01)
*H01R 13/717* (2006.01)

(52) U.S. Cl.
CPC ....... *H01R 13/5025* (2013.01); *H01R 13/506* (2013.01); *H01R 13/717* (2013.01)

(58) Field of Classification Search
None
See application file for complete search history.

(56) References Cited

U.S. PATENT DOCUMENTS 5,295,859 A * 3/1994 Kawai .................. H01R 13/506 439/447
2004/0248454 A1* 12/2004 Gunreben ............ H01R 13/639 439/352

(Continued)

FOREIGN PATENT DOCUMENTS

CN 201234008 5/2009
CN 201608399 10/2010

(Continued)

OTHER PUBLICATIONS

International Search Report filed in PCT/CN2020/000190 mailed Dec. 1, 2020.

*Primary Examiner* — Oscar C Jimenez
(74) *Attorney, Agent, or Firm* — Rankin, Hill and Clark LLP

(57) ABSTRACT

A snap-fit type self-locking combined upper cover for a power strip is formed by combining a first upper cover and a second upper cover. The first upper cover is provided with a cover body portion and a connecting portion integrally extending from the cover body portion. The upper surface of the connecting portion is provided with a plurality of snap-fit through holes for snap-fit bases to pass through. The inner wall of the connecting portion is provided with a plurality of connecting snap-fit fasteners which can be snap-fitted to the second upper cover. The second upper cover is a thin-walled shell with an accommodating space, an open bottom and one side open. The inner surface of the upper wall of the second upper cover is provided with a plurality of snap-fit bases projected vertically downward, which can be snap-fitted (Continued)

with the connecting snap-fit fasteners of the inner wall of the connecting portion to form the combined upper cover.

10 Claims, 4 Drawing Sheets

(56) References Cited

U.S. PATENT DOCUMENTS

| | | | | |
|---|---|---|---|---|
| 2006/0057880 | A1* | 3/2006 | Miksche .............. | H01R 13/639<br>439/352 |
| 2021/0127505 | A1* | 4/2021 | Lu ......................... | H05K 5/0013 |
| 2022/0320787 | A1* | 10/2022 | Yan ....................... | H01R 13/518 |

FOREIGN PATENT DOCUMENTS

| | | |
|---|---|---|
| CN | 206364260 | 7/2017 |
| CN | 210379536 | 4/2020 |
| JP | H06124744 | 5/1994 |

* cited by examiner

SNAP-FIT TYPE SELF-LOCKING COMBINED UPPER COVER FOR A POWER STRIP

TECHNICAL FIELD

The present invention relates to the field of electric connection devices, and in particular to a snap-fit type self-locking combined upper cover for a power strip.

BACKGROUND

The power strip is a connector between an electrical device and a power supply, and can extend one power aperture to form a multi-socket adapter so as to supply power to multiple electrical devices at the same time, so that the power strip is an essential article in daily life. With the continuous improvement of residents' economic and living standards, the number of household appliances and communication tools is increasing sharply, which makes people more and more dependent on power strips, so the demand on power strips is further increased.

At present, most of the power strips in the market are made of plastic materials for the housings which are assembled by threaded connection. Because of the threaded connection, installation holes must be arranged in the housings of the power strips, which seriously affects the integrity of the appearance of the power strip. Further, there is the possibility of screws getting loose. Once the screws get loose, the housings are separated, which will cause potential safety hazards to users.

In addition, at present, the power strip in the market is generally composed of an upper cover and a bottom board, and the upper cover is a main exhibited panel. However, due to the limitation of manufacturing cost and technological capability, the upper cover is of a one-piece structure and generally has only one color, which leads to low product recognizability.

SUMMARY

The object of the invention is to provide a snap-fit type self-locking combined upper cover for a power strip, which provides stable connection and, at the same time, enables the power strip to be formed by combining two plastic materials with different colors, so as to increase the recognizability of the power strip.

In order to achieve the above object, the present invention adopts the following technical solution:

A snap-fit type self-locking combined upper cover for a power strip is formed by combining a first upper cover and a second upper cover in a snap-fit connection manner;

the first upper cover is provided with a cover body portion and a connecting portion integrally extending from the cover body portion, each of the cover body portion and the connecting portion is a thin-walled shell with an accommodating space and an open bottom, the upper surface of the connecting portion is provided with a plurality of snap-fit through holes, the inner wall of the connecting portion is provided with a plurality of connecting snap-fit fasteners, and the outer surfaces of the sidewalls of the connecting portion are provided with a plurality of guide grooves;

the second upper cover is a thin-walled shell with an accommodating space and an open bottom and one side open, and is mounted on the connecting portion in a snap-fit manner; the inner surface of the upper wall of the second upper cover is provided with a plurality of snap-fit bases projected vertically downward, and the snap-fit bases pass through the snap-fit through holes of the connecting portion and are undetachably connected to the connecting snap-fit fasteners; and the inner surfaces of the sidewalls of the second upper cover are provided with a plurality of guide bars, which can be inserted into the guide grooves in a sliding manner.

According to the snap-fit type self-locking combined upper cover for a power strip, the inner surfaces of the sidewalls of the cover body portion of the first upper cover are provided with a plurality of closing snap-fit fasteners for undetachable connection with a bottom board of a power strip.

According to the snap-fit type self-locking combined upper cover for a power strip, the front sidewall of the connecting portion of the first upper cover is provided with a U-shaped opening, and the second upper cover is provided with a power cord hole at a corresponding position for a power cord to pass through.

According to the snap-fit type self-locking combined upper cover for a power strip, the upper wall of the connecting portion of the first upper cover is provided with a first button hole, and the second upper cover is provided with a second button hole at a corresponding position for a button to be embedded.

According to the snap-fit type self-locking combined upper cover for a power strip, the upper wall of the connecting portion of the first upper cover is provided with an indicator light mounting hole for an indicator light to be embedded, and the second upper cover is provided with a light-leaking hole at a corresponding position.

According to the snap-fit type self-locking combined upper cover for a power strip, each connecting snap-fit fastener is provided with a slope and a positioning surface located at the end of the slope, with the slope facing the upper wall of the first upper cover and the positioning surface being capable of abutting against and being snap-fitted into the snap-fit base of the second upper cover, and an enclosure is arranged around the connecting snap-fit fastener.

According to the snap-fit type self-locking combined upper cover for a power strip, each closing snap-fit fastener is provided with a slope and a positioning surface located at the end of the slope, with the slope facing the bottom of the first upper cover and the positioning surface being capable of abutting against and being snap-fitted with the snap-fit base of the bottom board, and an enclosure is arranged around the closing snap-fit fastener.

According to the snap-fit type self-locking combined upper cover for a power strip, the extending end of each snap-fit base is wedged, the middle of each snap-fit base is perforated to form a baffle, and the positioning surface can abut against and be snap-fitted with the baffle.

According to the snap-fit type self-locking combined upper cover for a power strip, the first upper cover and the second upper cover when combined together have outer surfaces engaged flush with each other.

According to the snap-fit type self-locking combined upper cover for a power strip, the first upper cover and the second upper cover have different colors.

The advantages of the present invention are as follows:

1. The first upper cover and the second upper cover are two parts separated from each other, which can have different colors respectively, thus improving the product recognizability.

2. Because the combined upper cover connected with the snap-fit fasteners has a self-locking function, causing a more stable connection, and the shells cannot be separated due to screws getting loose.

Figure 1:
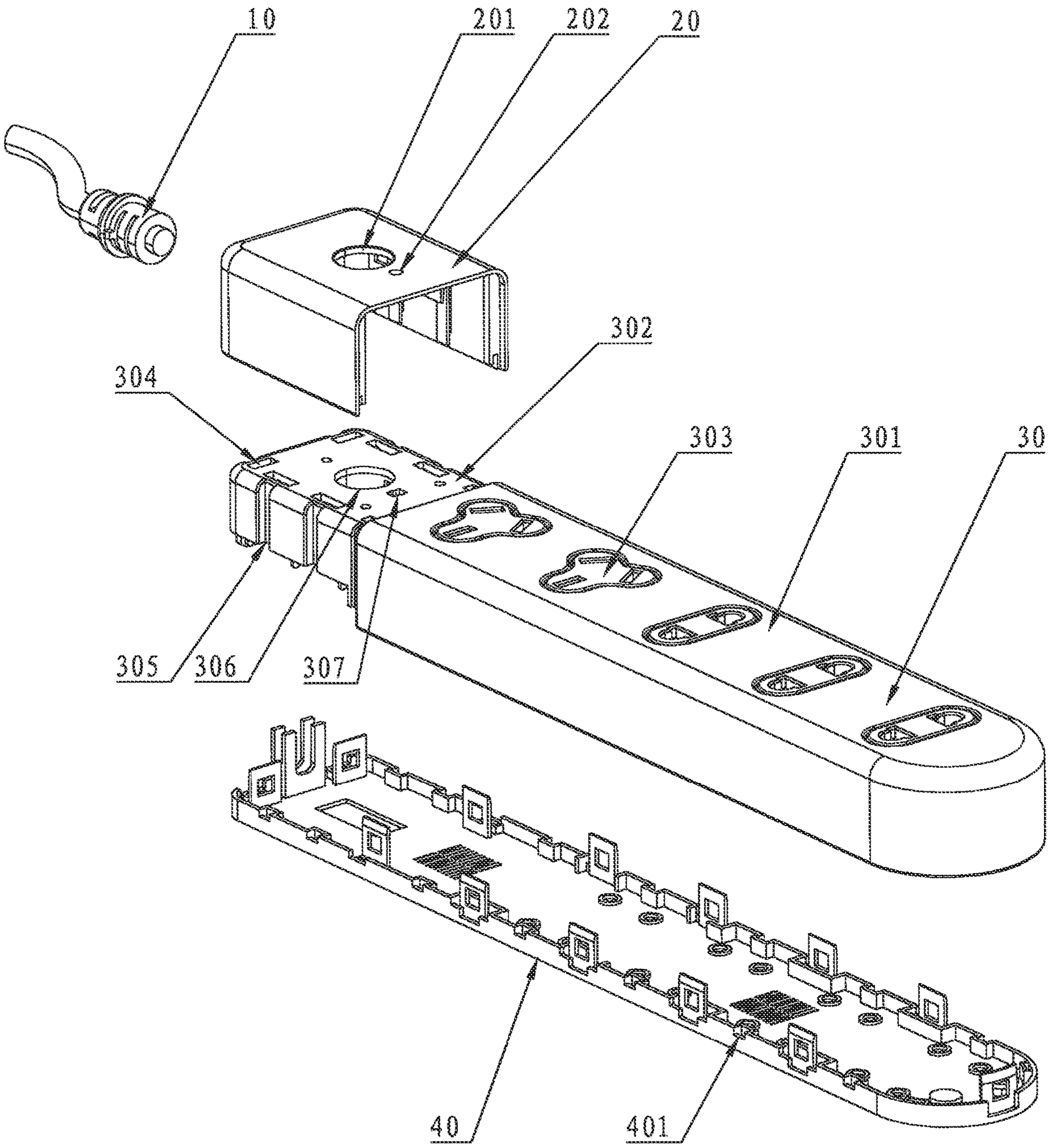
FIG. 1 is a schematic diagram of the composition of a combined upper cover.

Description of reference numerals: 10. power cord; 20. second upper cover; 201. second button hole; 202. light-leaking hole; 203. power cord hole; 204. snap-fit base; 205. guide bar; 206. baffle; 30. first upper cover; 301. cover body portion; 302. connecting portion; 303. socket aperture; 304. snap-fit through hole; 305. guide groove; 306. first button hole; 307. indicator light mounting hole; 308. closing snap-fit fastener; 309. enclosure; 310. positioning wall; 311. connecting snap-fit fastener; 312. positioning post; 313. slope; 314. positioning surface; 40. bottom board, 401. positioning notch.

DETAILED DESCRIPTION

Some specific embodiments of the present invention will be described in detail blow in an exemplary rather than limiting way with reference to the drawings. In the drawings, the same reference numerals denote the same or similar parts or portions. It should be understood by those skilled in the art that these drawings are not necessarily drawn according to a true scale.

Referring to FIG. 1, the present invention provides a snap-fit type self-locking combined upper cover for a power strip, which is formed by combining a first upper cover 30 and a second upper cover 20 by undetachably connecting snap-fit fasteners. The combined upper cover is then connected to a bottom board 40 through snap-fit fasteners to form a power strip housing, and a power cord 10 can be inserted from the end face and connected to each socket module inside.

Figure 2:
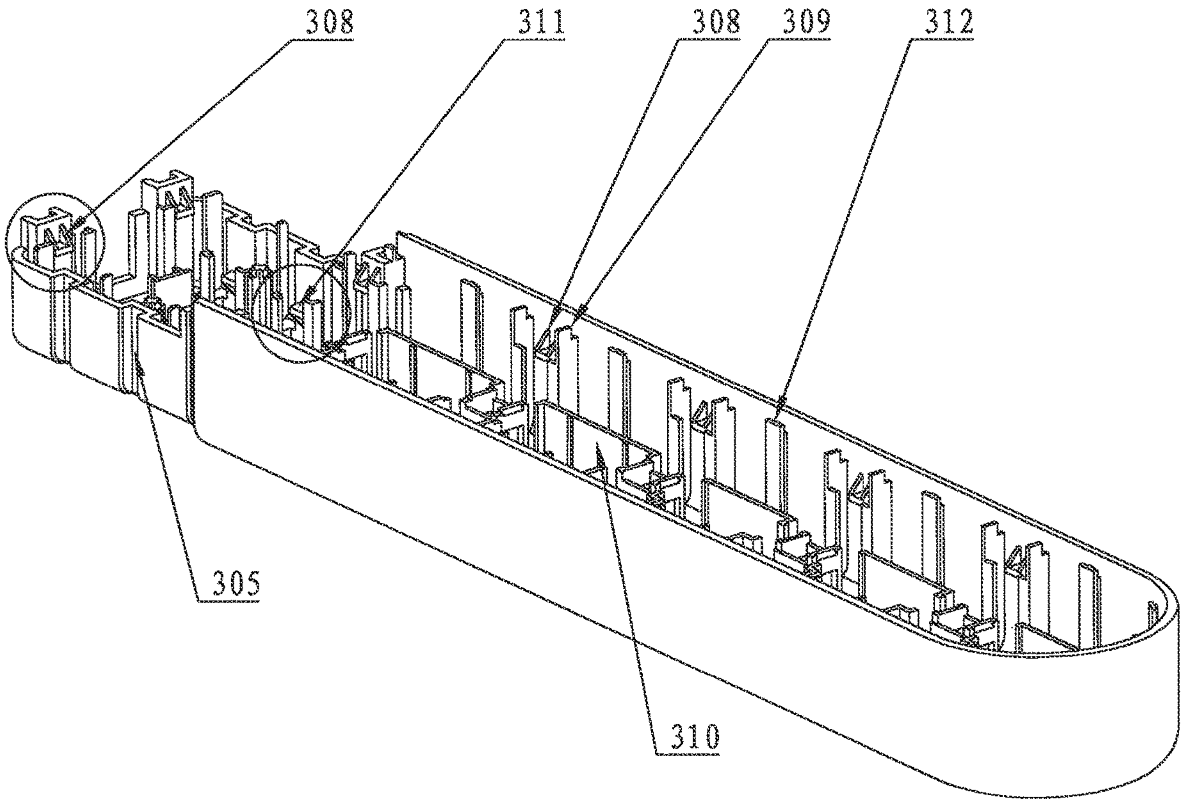
FIG. 2 is a three-dimensional view of a first upper cover.

Referring to FIG. 1 and FIG. 2, the first upper cover 30 is provided with a cover body portion 301 and a connecting portion 302 integrally extending from the cover body portion 301. Both the cover body portion 301 and the connecting portion 302 are thin-walled shells with accommodating spaces, open bottoms and an n-shaped cross section.

The upper surface of the cover body portion 301 is provided with a plurality of socket apertures 303. In the present embodiment, the socket apertures 303 include two three-phase socket apertures and three two-phase socket apertures, which can supply power to five electrical devices at the same time. The inner surface of the upper wall of the cover body portion 301 is provided with a circle of positioning wall 310 corresponding to the position of each socket aperture for positioning and installing each socket module. A plurality of closing snap-fit fasteners 308 with slopes are projected from the inner surfaces of the sidewalls of the cover body portion 301, with the slopes 313 of the closing snap-fit fasteners 308 facing the bottom of the first upper cover 30. The end of each slope 313 is provided with a positioning surface 314 for undetachable connection with the bottom board 40, and a group of enclosures 309 are arranged around each closing snap-fit fastener 308 for auxiliary positioning and prevention of snap-fit disconnection when the bottom board 40 is snap-fitted. The inner surfaces of the sidewalls of the cover body portion 301 are also provided with a plurality of positioning posts 312 for being positioned in positioning notches 401 when the cover body portion 301 is undetachably connected to the bottom board 40.

Figure 3:
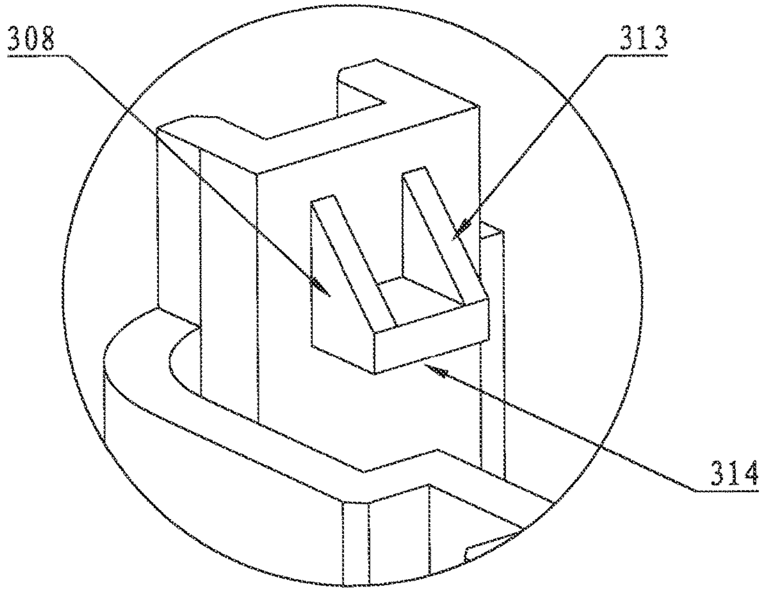
FIG. 3 is a partial three-dimensional view of a closing snap-fit fastener.

The width and height of the connecting portion 302 are less than those of the cover body portion 301, and the middle of the upper surface of the connecting portion 302 is provided with a first button hole 306 and an indicator light mounting hole 307, the upper surface of the connecting portion 302 is provided with a plurality of snap-fit through holes 304 at positions close to the sidewalls, and the outer surfaces on the three sidewalls of the connecting portion 302 are respectively provided with guide grooves 305. The sidewall of the front end (the end into which the power cord is inserted) of the connecting portion 302 is provided with a U-shaped opening for the power cord 10 to be inserted. Referring to FIG. 3, two closing snap-fit fasteners 308 are projected from the inner surfaces of the two sides of the U-shaped opening for undetachable connection with the bottom board 40, and a group of enclosures 309 (not shown in FIG. 3) are arranged around each closing snap-fit fastener 308.

Figure 4:
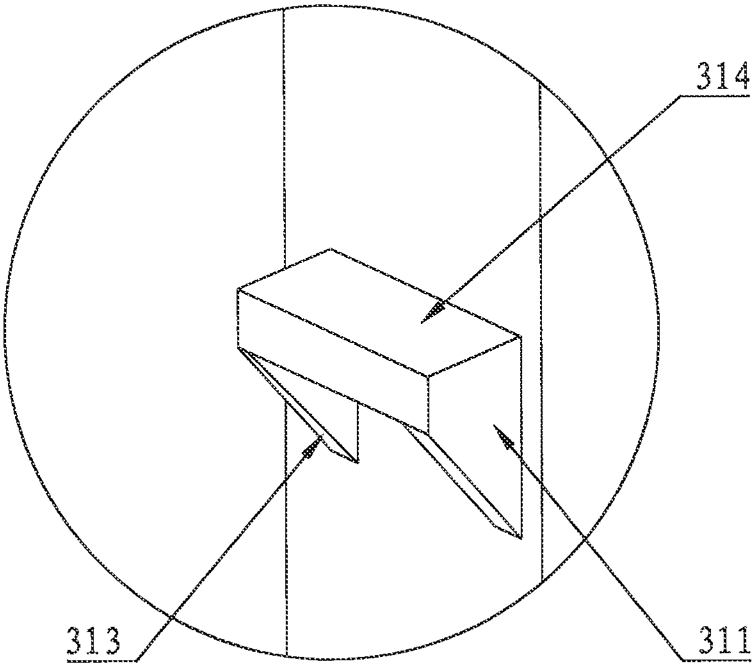
FIG. 4 is a partial three-dimensional view of a connecting snap-fit fastener.

Referring to FIG. 4, four connecting snap-fit fasteners 311 are projected from the inner surfaces of the two sidewalls of the connecting portion 302 for undetachable connection with the second upper cover 20. A group of enclosures 309 (not shown in FIG. 4) are arranged around each connecting snap-fit fastener 311. The structure of each connecting snap-fit fastener 311 is substantially the same as that of each closing snap-fit fastener 308, but the slope 313 of the connecting snap-fit fastener 311 faces the upper wall of the first upper cover 30.

Figure 5:
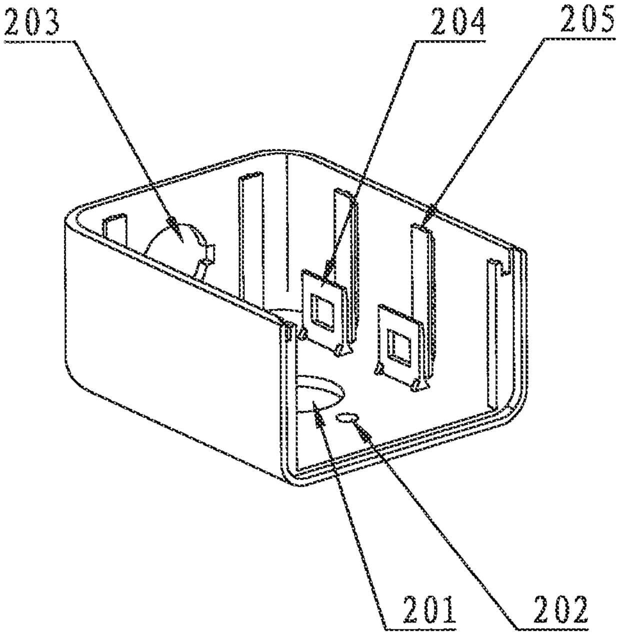
FIG. 5 is a three-dimensional view of a second upper cover.
Figure 6:
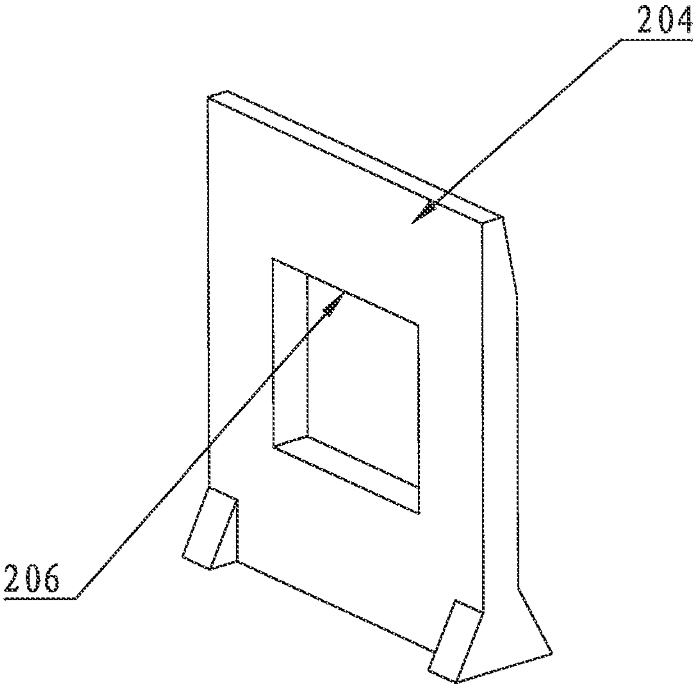
FIG. 6 is a three-dimensional view of a snap-fit base.

Referring to FIG. 1 and FIG. 5, the second upper cover 20 is an n-shaped thin-walled shell with an accommodating space and an open bottom and rear side open; the upper surface of the second upper cover 20 is provided with a second button hole 201 and a light-leaking hole 202, and the front side of the second upper cover 20 is provided with a power cord hole 203; and the positions of the second button hole 201, the light-leaking hole 202 and the power cord hole 203 respectively correspond to the first button hole 306, the indicator light mounting hole 307 and the U-shaped opening. The inner surface of the upper wall of the second upper cover 20 is provided with a plurality of snap-fit bases 204 vertically projected downward. Each snap-fit base 204 is a rectangular sheet body, the extending end of which is wedged and the middle of which is provided with a square hole, so that a baffle 206 for snap-fitting is formed. The inner surfaces of the two opposite sidewalls of the second upper cover 20 are provided with a plurality of guide bars 205 with a T-shaped cross section.

The edge of the outer wall is provided with an opposite step in a thickness direction at the joint between the second upper cover 20 and the first upper cover 30, so that the second upper cover 20 and the first upper cover 30 can fully fit each other when lapped, with the outer surfaces flush with each other.

When the first upper cover 30 is combined with the second upper cover 20, the guide bars 205 slide in the guide grooves 305 to play a guiding and positioning role, so that the snap-fit bases 204 pass through the snap-fit through holes 304 of the connecting portion 302 and vertically slides into the gaps between the connecting snap-fit fasteners 311 and the enclosures 309; the slopes of the connecting snap-fit fasteners 311 push the wedged ends of the snap-fit bases 204 in a sliding manner, so that the connecting snap-fit fasteners 311 and the snap-fit bases 204 are deflected from each other to pass through; and after the ends of the slopes of the connecting snap-fit fasteners 311 are staggered from the wedged ends of the snap-fit bases 204, the positioning surfaces 314 of the connecting snap-fit fasteners 311 are elastically restored to snap-fit into the square holes of the snap-fit bases 204 and abut against the baffles 206 of the snap-fit bases 204, so that snap-fit connection is achieved (and the connecting snap-fit fasteners 311 cannot get out). The enclosures 309 not only play an auxiliary positioning role in the snap-fit connection but also limit the movement of the snap-fit bases 204 toward a direction of separation, so that the snap-fit connection cannot be disassembled.

After forming the combined upper cover, the first upper cover 30 and the second upper cover 30 are then undetachably connected to the bottom board 40 to form a complete housing. When the combined upper cover is connected to the bottom board 40, the positioning posts 312 of the inner wall of the first upper cover 30 are correspondingly inserted in the positioning notches 401 of the bottom board 40 to play a positioning role; moreover, the snap-fit bases on the bottom board 40 are vertically inserted between the closing snap-fit fasteners 308 and the enclosures 309 of the inner wall of the combined upper cover, and the closing snap-fit fasteners 308 are snap-fitted into the snap-fit bases to achieve undetachable connection.

The advantages of the present invention are as follows:

Since the housing is assembled by the snap-fit fasteners in a snap-fit manner, a more stable and firmer connection can be obtained so as to avoid disconnection caused by threads getting loose that may occur in threaded connection; moreover, different colors can be sprayed on the separated upper cover assembly, improving product recognizability.

The above description is merely illustrative rather than limitative for the present invention, and those of ordinary skill in the art should understand that many modifications, changes or equivalents can be made without departing from the spirit and scope defined by the claims, but shall all fall within the protection scope of the present invention.

The invention claimed is:

1. A snap-fit type self-locking combined upper cover for a power strip, formed by combining a first upper cover and a second upper cover in a snap-fit connection manner, wherein the first upper cover is provided with a cover body portion and a connecting portion integrally extending from the cover body portion, each of the cover body portion and the connecting portion is a thin-walled shell with an accommodating space and an open bottom, the upper surface of the connecting portion is provided with a plurality of snap-fit through holes, the inner wall of the connecting portion is provided with a plurality of connecting snap-fit fasteners, and the outer surfaces of the sidewalls of the connecting portion are provided with a plurality of guide grooves;

the second upper cover is a thin-walled shell with an accommodating space and an open bottom and one side open, and is mounted on the connecting portion in a snap-fit manner; the inner surface of the upper wall of the second upper cover is provided with a plurality of snap-fit bases projected vertically downward, and the snap-fit bases pass through the snap-fit through holes of the connecting portion and are undetachably connected to the connecting snap-fit fasteners; and the inner surfaces of the sidewalls of the second upper cover are provided with a plurality of guide bars, which can be inserted into the guide grooves in a sliding manner.

2. The snap-fit type self-locking combined upper cover for a power strip of claim 1, wherein the inner surfaces of the sidewalls of the cover body portion of the first upper cover are provided with a plurality of closing snap-fit fasteners for undetachable connection with a bottom board of a power strip.

3. The snap-fit type self-locking combined upper cover for a power strip of claim 2, wherein each closing snap-fit fastener is provided with a slope and a positioning surface located at the end of the slope, with the slope facing the bottom of the first upper cover and the positioning surface being capable of abutting against and being snap-fitted with the snap-fit base of the bottom board, and an enclosure is arranged around the closing snap-fit fastener.

4. The snap-fit type self-locking combined upper cover for a power strip of claim 1, wherein the front sidewall of the connecting portion of the first upper cover is provided with a U-shaped opening, and the second upper cover is provided with a power cord hole at a corresponding position for a power cord to pass through.

5. The snap-fit type self-locking combined upper cover for a power strip of claim 1, wherein the upper wall of the connecting portion of the first upper cover is provided with a first button hole, and the second upper cover is provided with a second button hole at a corresponding position for a button to be embedded.

6. The snap-fit type self-locking combined upper cover for a power strip of claim 1, wherein the upper wall of the connecting portion of the first upper cover is provided with an indicator light mounting hole for an indicator light to be embedded, and the second upper cover is provided with a light-leaking hole at a corresponding position.

7. The snap-fit type self-locking combined upper cover for a power strip of claim 1, wherein each connecting snap-fit fastener is provided with a slope and a positioning surface located at the end of the slope, with the slope facing the upper wall of the first upper cover and the positioning surface being capable of being abutted against and snap-fitted into the snap-fit base of the second upper cover, and an enclosure is arranged around the connecting snap-fit fastener.

8. The snap-fit type self-locking combined upper cover for a power strip of claim 7, wherein an extending end of each snap-fit base is wedged, the middle of each snap-fit base is perforated to form a baffle, and the positioning surface can abut against and be snap-fitted with the baffle.

9. The snap-fit type self-locking combined upper cover for a power strip of claim 1, wherein the first upper cover and the second upper cover when combined together have outer surfaces engaged flush with each other.

10. The snap-fit type self-locking combined upper cover for a power strip of claim 1, wherein the first upper cover and the second upper cover have different colors.

* * * * *